Feb. 28, 1956
J. W. WRIGHT
2,736,352
SAW TOOTH ASSEMBLY
Filed May 9, 1950
2 Sheets-Sheet 1
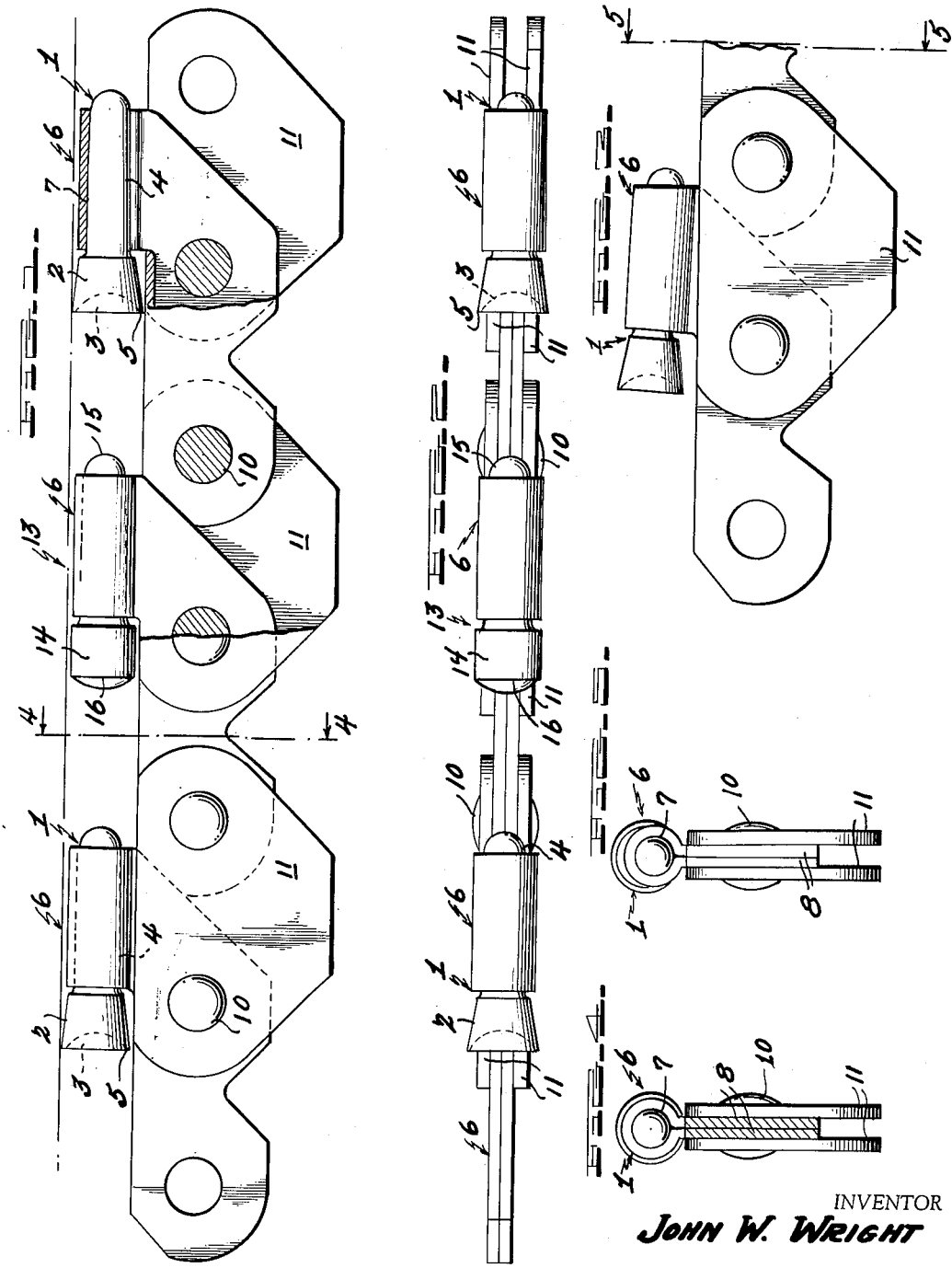
INVENTOR
JOHN W. WRIGHT
BY
ATTORNEYS Feb. 28, 1956　　　J. W. WRIGHT　　　2,736,352
SAW TOOTH ASSEMBLY
Filed May 9, 1950　　　2 Sheets-Sheet 2
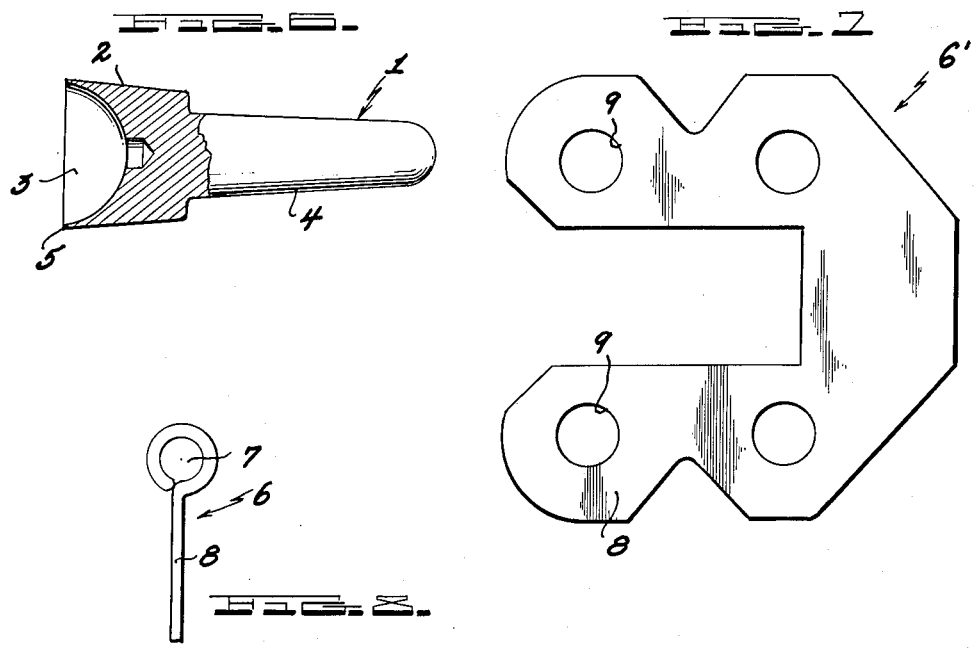
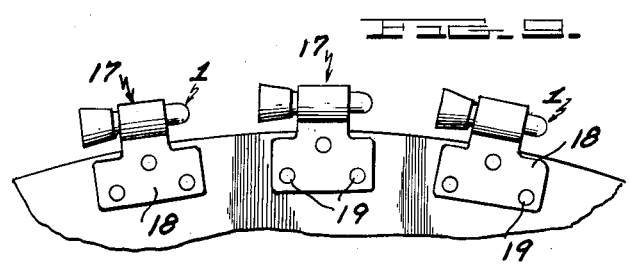
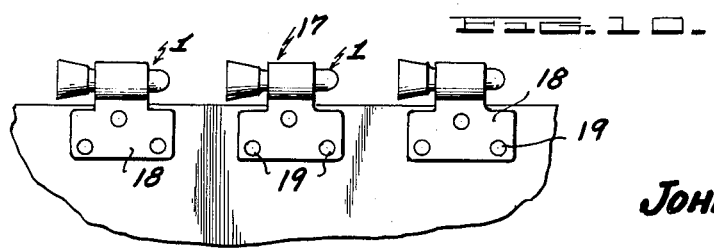
INVENTOR
JOHN W. WRIGHT
BY
*Semmes, Keegin, Robinson & Semmes*
ATTORNEYS

United States Patent Office 2,736,352
Patented Feb. 28, 1956

2,736,352

SAW TOOTH ASSEMBLY

John W. Wright, Bridgeport, Conn.

Application May 9, 1950, Serial No. 160,964

6 Claims. (Cl. 143—135)

This invention relates to a saw and more particularly to a sawtooth assembly.

In general, the invention comprises a sawtooth assembly which may be mounted in series upon a saw in spaced relation to form a cutting edge. The invention is designed to be used upon all types of saws including hand saws, chain saws, drag saws, band saws, and circular saws.

The tooth comprises a working portion having a concave front face, the peripheral edge of which forms a cutting edge. The tooth is provided with a shank which forms an integral part of the tooth and extends axially rearward from the working portion.

The tooth assembly is also provided with a socket into which the shank of the tooth can be inserted. The socket is designed for mounting on the periphery of a saw. A series of these tooth assemblies, in spaced relation, form the cutting edge of the saw.

The advantages of such a tooth assembly are numerous. Perhaps one of the more important resides in the fact that the individual teeth are readily replaceable. This permits the use of teeth made of hard steel because the necessity of hand sharpening and "setting" teeth by filing is eliminated. Preferably the socket is made of spring metal. The use of a spring metal socket is economical because it can be made by blanking or forming instead of forging. The spring action of this socket is also advantageous because it permits a greater tolerance in the dimensions of the shank of the tooth. For this reason, the tooth can be more economically manufactured and more easily inserted, removed, or rotated in the socket. There are a great number of other advantages in the structure of the tooth assembly which will be discussed in connection with the embodiment of the structure shown in the drawings.

The preferred embodiment shown in the accompanying drawings is for the purpose of illustration. However, it is to be understood that the embodiment shown and described is by way of illustration only and various changes may be made therein by those skilled in the art, such as changes in the shape, size and arrangement of the parts, and in the substitution of equivalents, without departing from the spirit of the invention.

In the drawings:

Figure 1 is a fragmentary view in side elevation of a portion of a saw chain embodying the present invention;

Figure 2 is a top plan view of the saw chain shown in Figure 1;

Figure 3 is a fragmentary view in side elevation of a portion of a saw chain embodying a modification of the invention;

Figure 4 is a view taken along lines 4—4 of Figure 1 in the direction of the arrows;

Figure 5 is a view taken along lines 5—5 of Figure 3 in the direction of the arrows;

Figure 6 is a view in side elevation of a sawtooth, partly broken away;

Figure 7 is a top plan view of a saw chain link before being shaped;

Figure 8 is a front view of a modified form of a tooth holding socket;

Figure 9 is a view in side elevation of a disc saw embodying the present invention; and Figure 10 is a view in side elevation of a band saw embodying the present invention.

In all forms of the invention shown in the drawings, and as best shown in Figure 6, the sawtooth, which is generally designated by the numeral 1, comprises a circular working portion 2, having a concave face 3 and a shank portion 4. The periphery of the concave face portion 3 forms a cutting edge 5. The shank 4 forms an integral part of the working portion 2 and extends axially from the rear face of the working portion. Preferably, the shank 4 has a converging taper away from the working portion 2, as shown in Figure 6.

The working portion 2 of the tooth 1 may be of any suitable shape. In the form of the invention shown in Figure 1, the working portion 2 is cylindrical in shape. In the modification shown in Figure 3, the working portion 2 is frusto-conical in shape. In addition, the working portion 2 can be of any other suitable shape, such for example as a square or semi-circle shape, but a circular shape is preferred in order that a maximum cutting edge 5 will be present. As the entire working face of such a tooth is not used in the cutting operation, a new cutting edge can be presented by rotating the tooth in the tooth holding socket 6.

The tooth holding socket 6 is made by bending over a piece of stamped out spring metal 6', shown in Figure 7, to form a channel 7 and base plates 8, as shown in Figures 4 and 5. In the modification shown in Figure 8, the spring metal is bent so that only a single base plate 8 is formed. The shank 4 of the tooth 1 is designed for insertion in the channel 7. In the preferred form of the invention both the shank 4 and the channel 7 are tapered.

In either of the described forms of the socket 6, the base plates 8 are each provided with apertures 9. These apertures are in opposed relation in the form of the socket having a pair of base plates 8 in order to permit the insertion of a rivet 10.

The use of spring metal to form the tooth holding socket 6 is very important as it not only reduces the cost of manufacture of the socket but also permits a greater tolerance in the dimensions in the shank of the tooth and permits the tooth to be readily inserted, removed or rotated. A low grade metal can be used because the socket 6 does not form a part of the cutting edge.

The saw chain shown in Figures 1, 2 and 3 of the drawings is formed by connecting the base plates 8 of successive tooth holding sockets 6 by means of chain links 11. These links 11 are provided with equally spaced apertures. As best shown in Figures 4 and 5, a link 11 is positioned on each side of the base plates 8 of a socket 6 and are joined to the base plate 8 by means of the rivet 10 which passes through the aligned apertures of both the links 11 and the base plates 8. The same base links are connected in the same way to the adjoining socket 6. In this manner, successive sockets 6 are joined to form the chain. Alternately, the links may be joined to the base plates 8 by any suitable manner.

As best shown in Figure 1, a guide 13 may be inserted in alternating sockets 6 in the series forming the cutting edge of the chain saw. This guide is provided with a working portion 14 and a shank 15 similar to those composing the tooth 1. However, the working face 16 is not concave and does not present a cutting surface. On the contrary the guide 13 is designed to govern depth of cut and to regulate "wildness" in the chain.

In mounting the tooth assembly, the socket 6 may be fashioned so that the channel 7 will be parallel to the base plate and the portion of the saw upon which it is mounted. However, in the modified form shown in Figures 3 and 5, the channel 7 is slanted to form an angle with the portion of the saw upon which it is mounted. This adaptation can be used with saws other than chain saws.

In assembling a chain saw, the angle of the sockets selected, the diameter of the tooth employed, as well as whether to omit the use of guides, will depend upon the particular situation including the type of the wood to be sawed. These variations in the tooth assembly embodied in the present invention are important for they give rise to a self-balance and self-adjustment of the chain which are not present in prior chain saws.

For example the diameter of the selected teeth will control the degree of bite, and it may be controlled partially or entirely by the relation of the thickness of the portion of the socket forming the upper portion of the channel as compared to the diameter of the channel. In addition, the angle of the channel with respect to the base plate of the socket will influence the depth of bite. In all cases, it is desirable that the outside diameter of the portion of the socket forming the channel should approach the diameter of the face of the tooth to prevent the tooth from gouging but this diameter should not be the same as the diameter of the tooth as some "wildness" in the chain is desirable.

It is also desirable to have the diameter of the depth guide smaller than the working face of the tooth. One edge of the depth guide can be flattened to permit regulation by rotation of each guide in its socket. Of course, either guides or teeth can be readily replaced by ones having different diameters.

Each tooth holding socket projects beyond the sides of the link upon which it is mounted. This prevents backward movement of the link because the socket engages the adjacent link. Furthermore the pressure of the wood against a tooth causes the front part of the link upon which it is mounted to rise and this is transmitted to the next preceding tooth bearing link causing it to bear against the bottom of the cut and reduce the chip of the next tooth. These are self-adjustment features which make the cut uniform.

This is assisted by the shape of the tooth, the side cutting edges of which are slightly in advance of the center cutting bottom portion. This has the effect, in cross cutting, of severing the fibers at each side of the kerf just before they are scooped out by the central cutting portion. Evidence of this is the long, uniform, perfectly formed chips which are produced by the chain in actual cutting.

The forms of the invention shown in Figures 9 and 10 embody the invention mounted on a disc saw, and a band saw or blade saw, respectively. Of course, in these or other blade saws, a chain link is not required. However, in saws of this type the base of the tooth holding socket should be modified in form. Preferably, this socket 17 comprises a single base plate 18 provided with a plurality of apertures. In mounting the socket, these apertures are aligned with apertures in the band of the saw and the parts are secured together by rivets 19. Of course, the base of the sockets 17 may be bifurcated to straddle the saw blade for additional strength, if desired. In such an event the apertures in each base plate 18 must be opposed to corresponding apertures in the remaining base plate 18 to permit passage of the rivets 19, or they may be spot welded.

I claim:

1. In a chain saw, a series formed of alternating teeth and guides, each tooth and guide comprising a circular working portion, an integrally formed axially extending shank extending rearwardly from the working portion of each tooth or guide, the rear face of the working portion forming an annular stop shoulder at the front end of the shank, each shank having a rearwardly converging taper, a socket for each tooth and guide in which the shank is inserted, the channel in each socket being tapered to correspond with said shank, links connecting said sockets to form a chain, and the working portion of each tooth having a concave front face, the peripheral edge of which forms an arcuate cutting edge.

2. In a chain saw as set forth in claim 1 wherein the working portions of said teeth are of greater diameter than the tooth holding portions of the socket and extend radially outwardly of said sockets to engage material to be cut without the material being contacted by said sockets.

3. In a chain saw as set forth in claim 1 wherein the working portions of said guides are of smaller diameter than the diameter of the working portions of said teeth.

4. In a chain saw as set forth in claim 1 wherein there is a series of connected links and the said sockets project beyond the sides of each link with the front end of the sockets disposed closely adjacent the rear end of the link next preceding whereby backward movement of said preceding link is prevented.

5. In a chain saw as set forth in claim 1 wherein the sockets for the teeth are made of spring metal.

6. In a saw, a series of alternating teeth and guides, each tooth and guide comprising a circular working portion, an integrally formed axially extending shank extending rearwardly from the working portion of each tooth and guide, the rear face of the working portion of each tooth and guide forming an annular stop shoulder at the front end of the shank, each shank having a rearwardly converging taper, a socket for each tooth and guide in which the shank is inserted, the channel of each socket being tapered to correspond with said shank, means connecting said sockets together in line, and the working portion of each tooth having a concave front face, the peripheral edge of which forms an arcuate cutting edge.

References Cited in the file of this patent

UNITED STATES PATENTS

| | | |
|---|---|---|
| 279,781 | Magaw | June 19, 1883 |
| 482,033 | Atkinson | Sept. 6, 1892 |
| 1,244,785 | Sessions | Oct. 30, 1917 |
| 1,362,244 | Farley | Dec. 14, 1920 |
| 2,534,591 | Geurian | Dec. 19, 1950 |

FOREIGN PATENTS

| | | |
|---|---|---|
| 16,476 | Great Britain | Sept. 29, 1891 |